Figure 1:
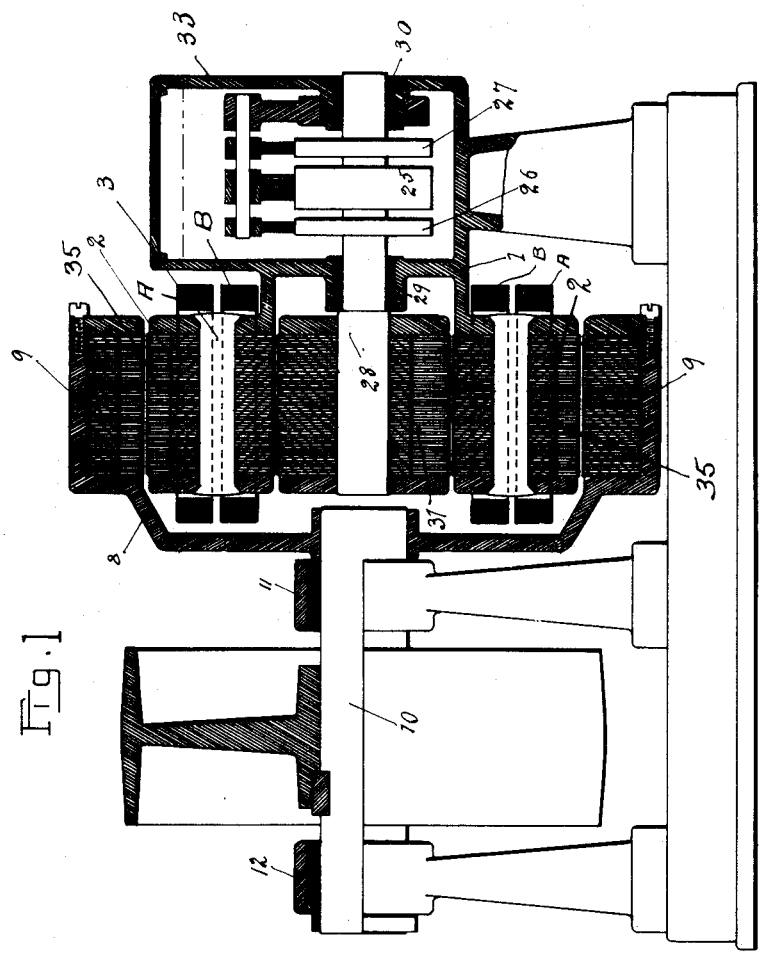

A. H. NEULAND.
DYNAMO ELECTRIC MACHINE.
APPLICATION FILED APR. 21, 1913.

1,171,352.

Patented Feb. 8, 1916.
7 SHEETS—SHEET 1.

WITNESSES:
J. B. Gardner
H. G. Prost.

INVENTOR
A. H. NEULAND

BY
Miller & White
HIS-ATTORNEYS

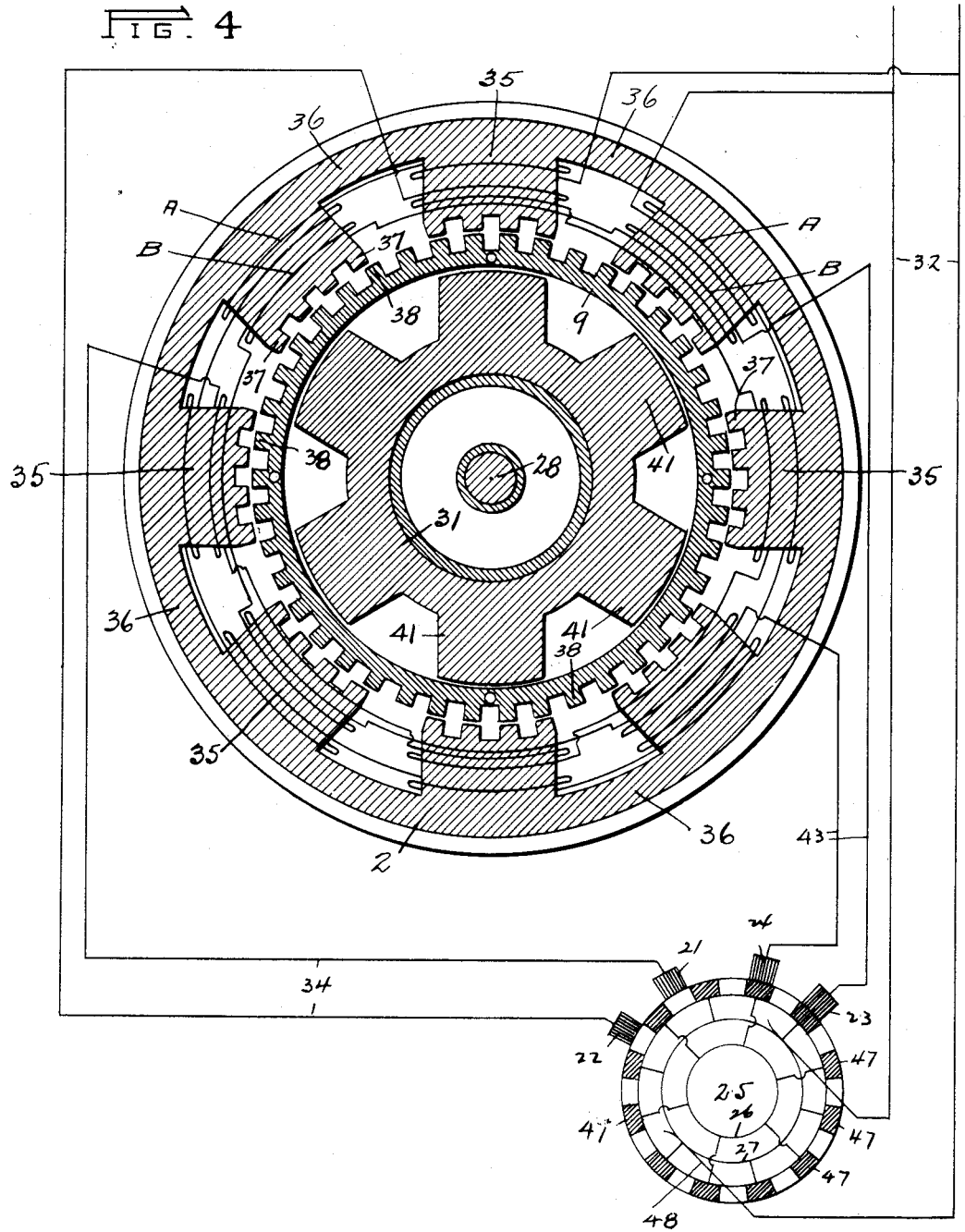

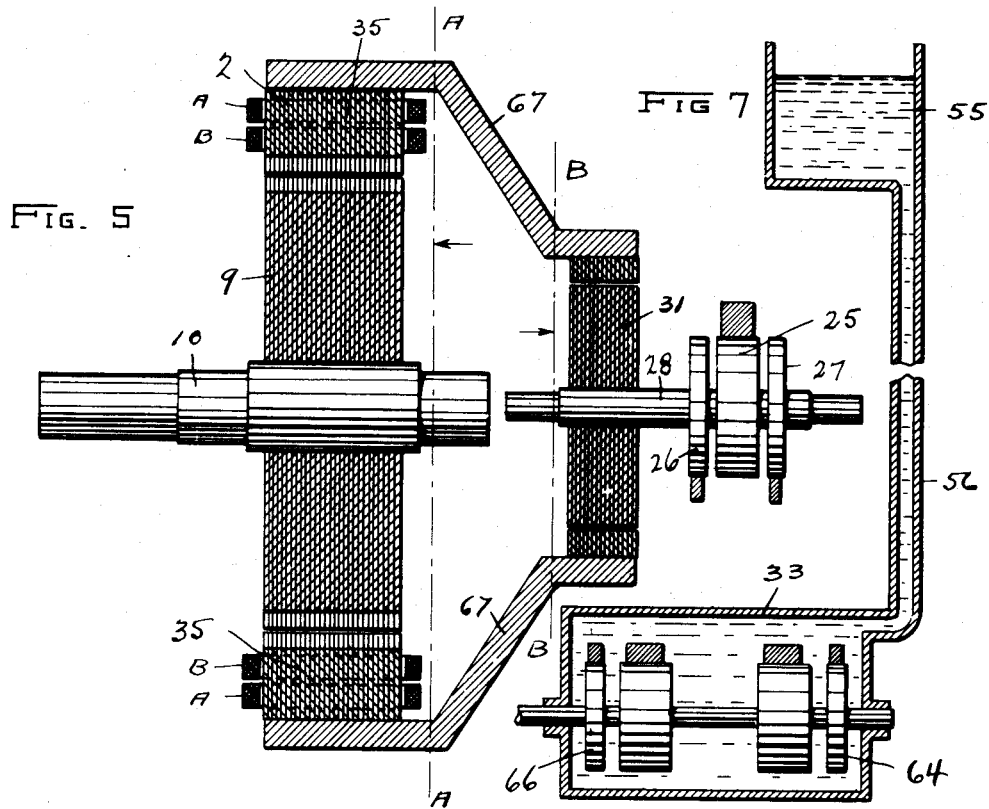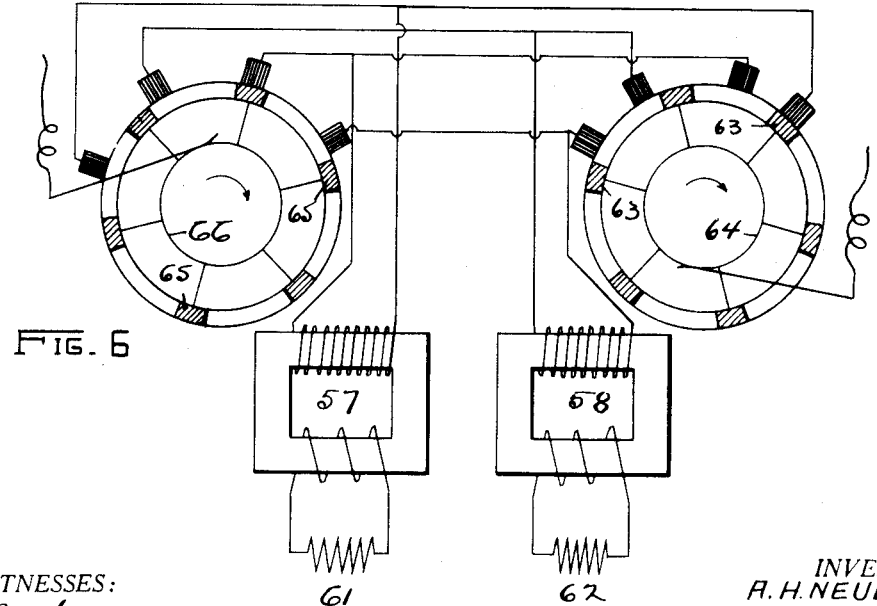

A. H. NEULAND.
DYNAMO ELECTRIC MACHINE.
APPLICATION FILED APR. 21, 1913.

1,171,352.

Patented Feb. 8, 1916.
7 SHEETS—SHEET 6.

WITNESSES:
J. B. Gardner
H. G. Prost

INVENTOR.
A. H. NEULAND
BY Miller & White
HIS ATTORNEYS.

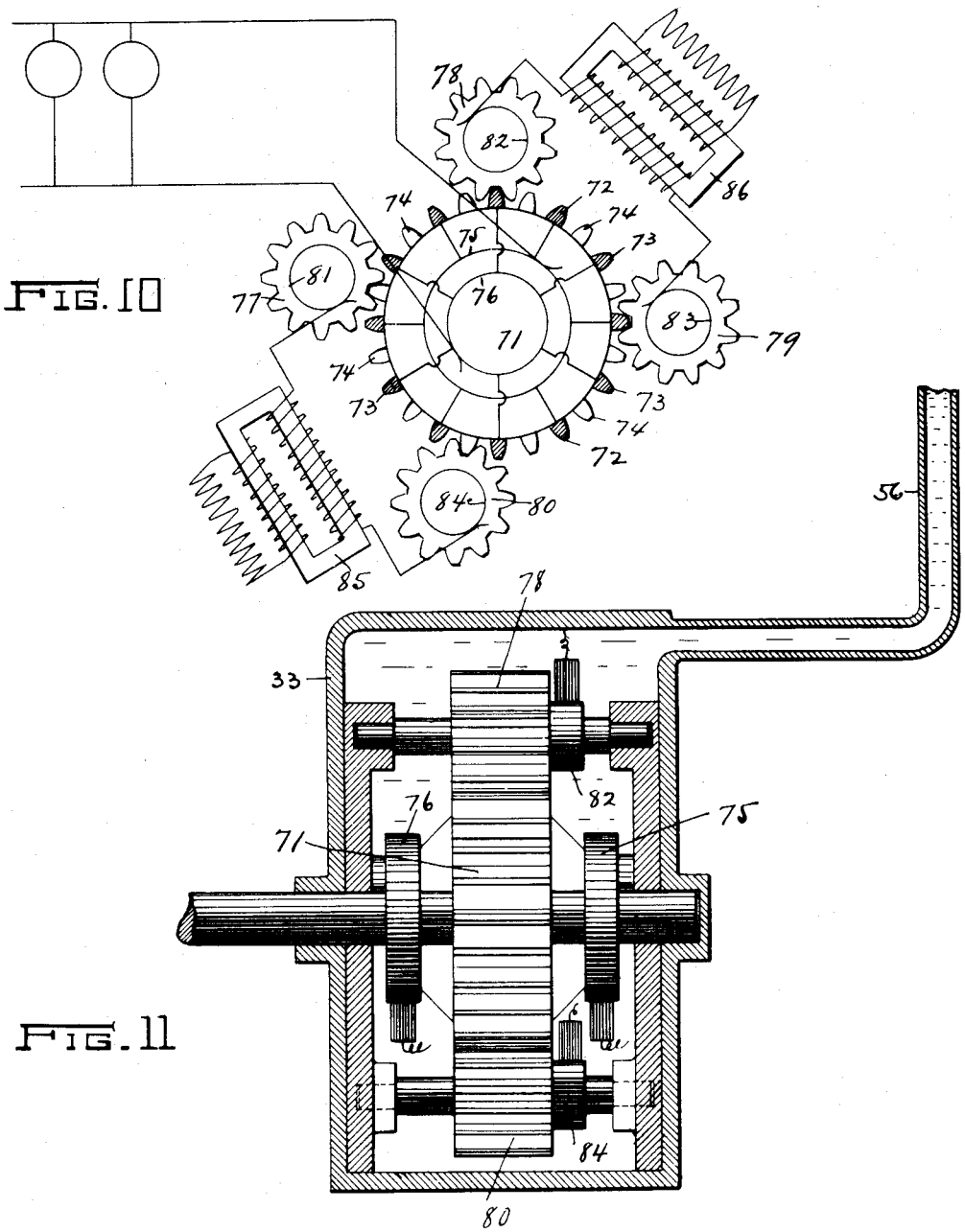

UNITED STATES PATENT OFFICE.

ALFONS H. NEULAND, OF SAN FRANCISCO, CALIFORNIA, ASSIGNOR TO NEULAND ELECTRICAL COMPANY, INC., A CORPORATION OF NEW YORK.

DYNAMO-ELECTRIC MACHINE.

1,171,352.   Specification of Letters Patent.   Patented Feb. 8, 1916.

Application filed April 21, 1913. Serial No. 762,525.

*To all whom it may concern:*

Be it known that I, ALFONS H. NEULAND, a subject of the Czar of Russia, and a resident of the city and county of San Francisco, State of California, have invented certain new and useful Improvements in Dynamo-Electric Machines, of which the following is a specification.

The invention relates to dynamo electric machines, and particularly to dynamo electric machines of the commutating type, and to the method of converting mechanical energy into electrical energy and vice versa.

The object of the invention is to provide a dynamo electric machine of the commutating type of high tension and power.

Another object of the invention is to provide a method of converting mechanical energy into electrical energy, and vice versa.

Another object of the invention is to provide a dynamo electric machine of the commutating type which is much smaller and lighter than standard machines of the same power capacity.

Another object of the invention is to provide a dynamo electric machine of great power capacity in which the commutator is simple and inexpensive.

A further object of the invention is to provide a commutating device for high tension machines which eliminates the use of commutator brushes.

Another object of the invention is to provide a dynamo electric machine of the commutating type in which the various windings remain stationary.

The invention possesses many other advantageous features, which, with the foregoing, will be set forth at length in the following description where I shall outline in full that form of the invention which I have selected for illustration in the drawings accompanying and forming part of the present specification. The novelty of the invention will be included in the claims succeeding said description. From this it will be apparent that I do not restrict myself to the showing made by said drawings and description, as I may adopt many variations within the scope of my invention as expressed in said claims.

Figure 2:
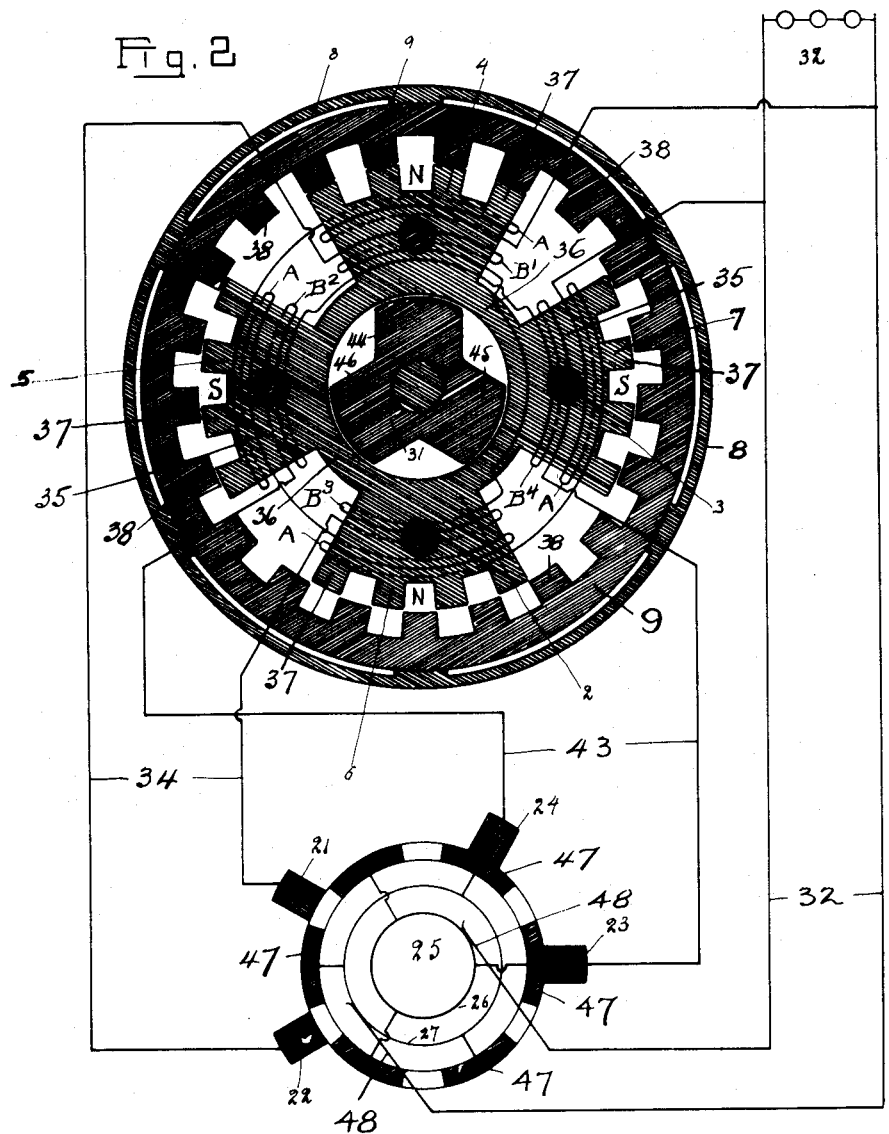
Figure 3:
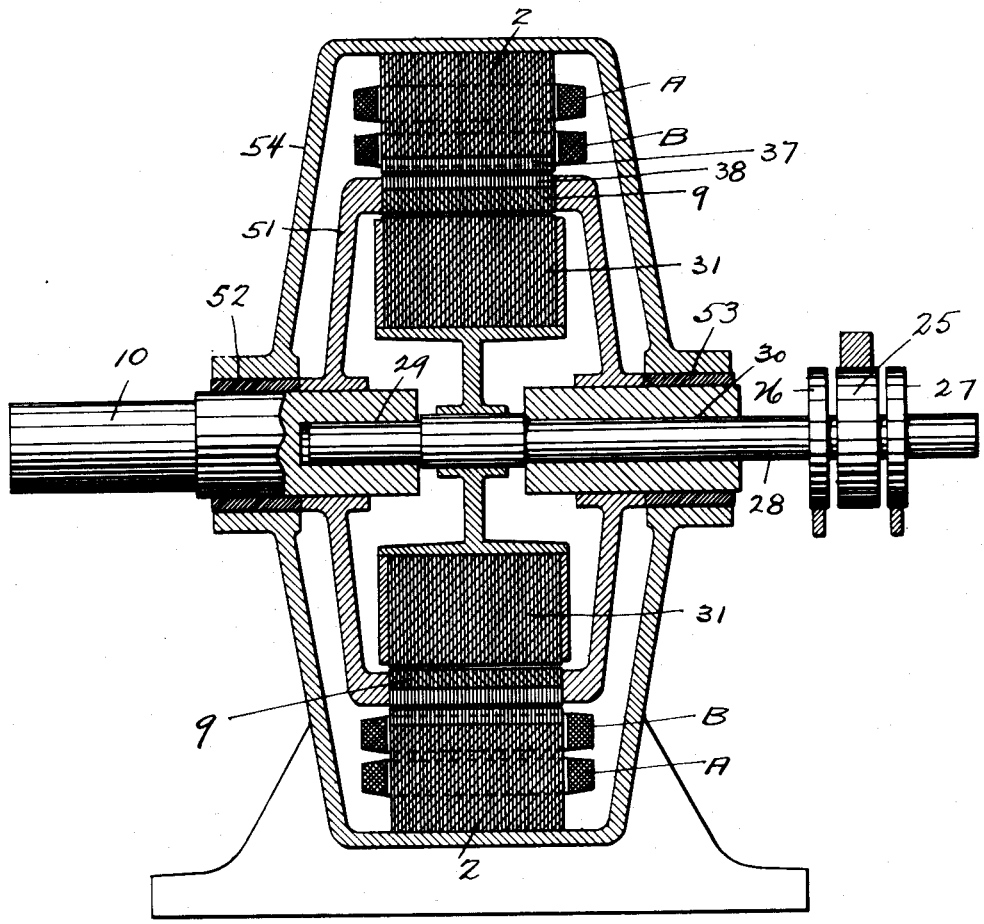
Figure 8:
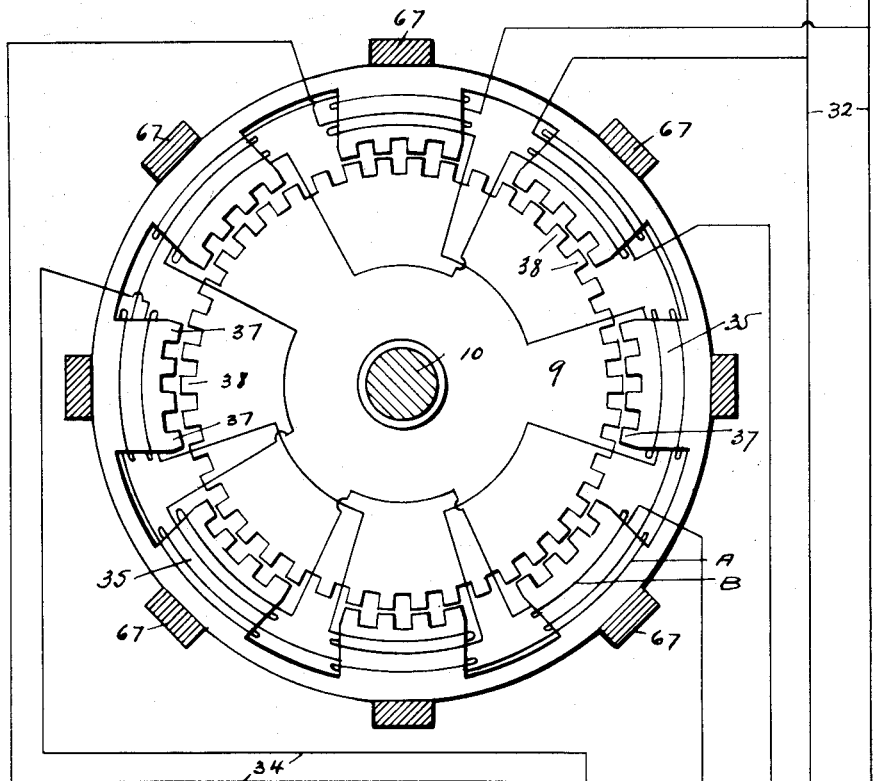
Figure 9:
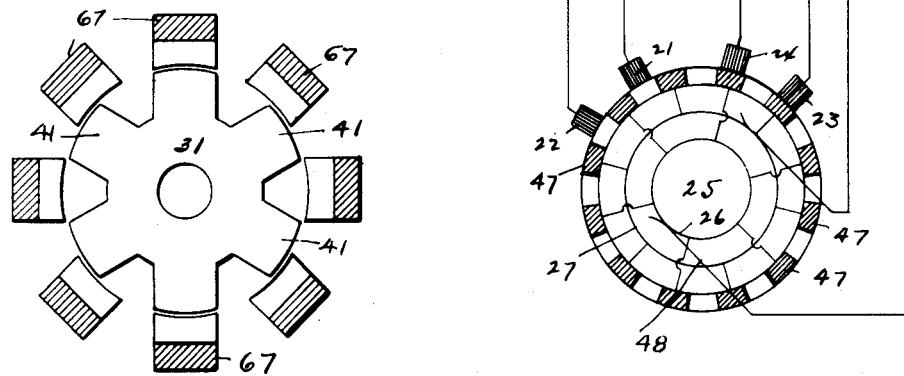

Referring to said drawings: Figure 1 is a somewhat diagrammatic longitudinal vertical section of one form of the machine of my invention. Fig. 2 is a partly diagrammatic cross section of the machine shown in Fig. 1, showing the arrangement of the windings and circuits. Fig. 3 is a somewhat diagrammatic vertical longitudinal section of another form of the machine. Fig. 4 is a partly diagrammatic cross section of the construction shown in Fig. 3. Fig. 5 is a somewhat diagrammatic vertical longitudinal section of another form of machine. Fig. 6 is a diagrammatic representation of a high tension current commutator arrangement. Fig. 7 is a cross section of an oil pressure receptacle surrounding the commutators on high tension machines. Fig. 8 is a view taken on the line A—A Fig. 5 looking in the direction of the arrow, the windings and circuits being shown diagrammatically. Fig. 9 is a cross section on the line B—B Fig. 5 looking in the direction of the arrow. Fig. 10 is a partly diagrammatic representation of a commutator device adapted to be used in connection with high tension currents. Fig. 11 is a side view of the commutating device inclosed in an oil containing chamber.

The object of my invention is to produce a successful and efficient commutating machine of great power in comparison to its size, for generating direct currents or converting either a direct or an alternating current into mechanical energy or converting an electric current from one form to another.

The great power of my machine is obtained by the large number of magnetic changes which take place during each revolution of the flux carrrying element, or flux conductor. Ordinarily the production of an increased number of magnetic changes per revolution does not necessarily imply an increase of efficiency and power, in fact, quite the reverse is generally true, since the large number of poles necessary to produce this effect requires numerous individual coils and a great amount of armature and field copper, hence a large copper loss. The same is true with regard to the iron losses, consisting of the eddy current and hysteresis losses caused by the large number of reversals of the magnetic flux in the iron for each revolution. A still greater difficulty is encountered in the construction of the commutator, which under the present standard practice must necessarily be provided with an excessively large number of segments.

In the commutating machine which I have produced and which will be more fully described hereinafter, these difficulties have been substantially entirely overcome. The windings, both magnetizing and induced, are located on the same member of the machine, preferably the stationary member, and are in close relation to each other. Furthermore, a large number of poles of like sign or polarity are surrounded by a single magnetizing coil and a number of like varying fluxes are surrounded by a single induced coil. In this manner a powerful magnetic flux is produced by a small exciting current, a large number of changes of flux per revolution is effected and the ohmic drop in the induced circuit is reduced to a small fraction. As the term flux varying element or flux conductor implies, this element serves to vary the flux in the pole-pieces, and conduct it from one pole-piece to another as will hereafter be described. This changing flux does not alternate, but varies substantially from zero to a maximum, thereby materially reducing the iron losses. Although the flux in the pole-pieces varies and does not alternate, it produces a true alternating flux through the induced circuit during the movement of the flux varying element, of a distance equal to the pitch of the teeth thereon.

In my commutating machine the effect of an alternating magnetic flux through the induced circuit by varying the flux in the toothed pole-pieces, is produced by surrounding one or more pairs of toothed pole-pieces, forming a group, by an induced circuit. When a group consists of two pole-pieces and both are traversed by a changing magnetic flux in the same direction, then the induced circuit on these pole-pieces must be arranged so that the turns run in opposite directions with respect to each other. If, on the other hand, two adjoining toothed pole-pieces belong to the same group, and the changing magnetic flux traversed one pole-piece in opposition to the flux in the other, then the induced winding would surround both toothed pole-pieces in the same direction. Further, in order that the direct current shall be of constant value, the commutating machine is provided with two or more of the aforementioned groups of pole-pieces. The teeth on the pole-pieces belonging to the different groups have a position differing from one another with regard to the teeth on the flux varying element, serving to produce currents in the separate circuits surrounding the groups, differing in electrical time phase from one another.

The rotation of the flux varying element serves to vary the magnetic flux in the toothed pole-pieces and conduct it from one pole-piece to another. This varying flux has been employed in the present commutating machine to impart synchronous rotation to a separate toothed core provided with a smaller number of projections than the flux varying element, to which core a commutator is attached. The angular velocity of this toothed core is greater than that of the flux varying element in the proportion of the number of teeth on the flux varying element to the number of teeth on the rotating commutator core. By selecting the ratio of the numbers of teeth on these two elements as 7 to 1 for example, the commutator would have an angular velocity seven times that of the flux varying element, and instead of having a commutator with twice the number of segments as there are teeth on the flux varying element, the commutator need only be provided with one-seventh as many teeth. This feature allows the commutator to be made much smaller than standard commutators, obviates the expensive construction and delicate arrangement of the insulation of standard commutators containing a large number of segments, and since the segments may be spaced apart at some distance, the liability of short circuiting the commutator segments is overcome.

The energy losses in the iron and in the electric circuits are greatly reduced by the use of the machine of my invention. The loss due to molecular friction in the iron caused by the reversal of the magnetism in machines as heretofore constructed, and commonly known as the hysteresis loss, is greatly reduced, since the magnetic flux is not reversed. The loss of energy due to the eddy currents in the laminated iron is also substantially reduced, since the eddy currents induced by a varying magnetic flux are very small in comparison with those induced by an alternating magnetic flux. By surrounding a number of poles of like sign with a single exciting winding, a considerable saving of copper in the exciting circuit is effected, and since for a given current density the exciting watts are in proportion to the exciting copper, a corresponding reduction in the exciting watts is obtained. The same is true with regard to the induced coils, where the voltage per turn is great, owing to the high rate of change of the magnetic flux. Therefore, the turns are few in number and the resistance of the induced circuit is low, with a consequent low ohmic loss.

Other conditions being constant, the power generated in a given sized machine depends upon the rate at which the magnetic flux is varied. In the present machine, owing to its peculiar construction, the rate of change of flux in proportion to the speed of the machine is high, consequently the machine has a much greater power capacity than machines of the same size of standard construction.

The present machine, which can be operated with equal efficiency, either as a motor or a generator, comprises a stationary core 2, formed of laminations which are held together by suitable means, such as the bolts 3. The core 2 is formed of a plurality of sections or pole-pieces 35 spaced apart from each other, the pole-pieces being arranged preferably diametrically opposite each other in pairs. The various pole-pieces are joined together at one face or end thereof by the bridges 36, which are formed integral with the pole-pieces. The opposite or free faces or ends of the pole-piece 35 are provided with a plurality of teeth or projections 37 of regular pitch and spacing. The various pole-pieces are preferably of the same width and are each provided with the same number of teeth.

Arranged adjacent the teeth 37 of the pole-pieces is a rotating element 9 formed of laminations, provided on the face adjacent the teeth 37 with a plurality of teeth or projections 38, which lie adjacent the faces of the teeth 37, the faces of the two sets of teeth being separated by an air gap. The teeth 38 are of substantially the same size and pitch as the teeth on the pole-pieces and are arranged so that when several of the teeth 38 on the rotating element 9, coincide with the teeth 37 on one pole-piece, the teeth on the next pole-piece are partly offset with regard to the teeth 38, and the teeth on the third pole-piece are staggered with regard to the teeth 38. Since the rotating element 9 operates to shift the magnetic flux from one pole-piece to another during its rotation, as will be hereinafter explained, it will be termed a flux varying element. The flux varying element is fixed upon the rotatable shaft 10, through the intervention of a spider or casing 8, which shaft is suitably mounted in bearings 11—12. Mounted on shaft 10, is a pulley or gear or other means for transmitting power, and power is supplied to or taken off from the machine at this shaft.

Surrounding each pole-piece is a magnetizing winding A and an induced or consuming winding B depending upon whether the apparatus is being operated as a generator or motor. The magnetizing windings A are preferably connected in series, the alternate pole-pieces being wound in one direction and the remaining pole-pieces being wound in the opposite direction, thereby producing successive poles of opposite polarity. The induced or consuming windings B are arranged in series in a plurality of circuits which are connected at their ends to the commutator brushes. When the coils belonging to one phase surround poles of like polarity and the arrangement of these poles is such that the magnetic circuit is closed through one pole and open at the other, the coils are connected in opposition; when the arrangement of these poles is such that the magnetic circuit is closed or open at both poles, the coils are wound in the same direction. When the coils belonging to one phase surround poles of unlike polarity and the arrangement of these poles is such that the magnetic circuit is closed through one pole and open at the other, the coils are wound in the same direction; when the arrangement of these poles is such that the magnetic circuit is open or closed at both of these poles, the coils are connected in opposition.

In the construction shown in Fig. 2, I have employed four pole-pieces 4—5—6 and 7 having their centers spaced apart substantially 90 degrees, and have provided each pole-piece with four teeth 37. The flux varying element 9 is provided with twenty-one teeth 38 spaced apart regularly around the circle. The teeth are proportioned so that when the teeth 38 coincide with the teeth 37 on pole-piece 4, they are staggered with relation to the teeth on pole-piece 6 and substantially half offset with relation to the teeth on pole-pieces 5 and 7. Surrounding the pole-pieces are the coils or windings A of the magnetizing circuit, the coils on poles 4 and 6 being wound in one direction to produce a positive or north polarity indicated by N at the teeth 37 on pole-pieces 4 and 6 and the coils on poles 5 and 7 being wound in the opposite direction thereto to produce a negative or a south polarity, indicated by S, at the teeth 37 on pole-pieces 5 and 7. The magnetizing coils A are connected in series and may be separately excited or may be excited by the current which is derived from or fed into the machine. Surrounding pole-pieces 4 and 6 are the coils $B^1$ and $B^3$ of one induced or consuming circuit 34, the coils being connected in series and wound in opposite directions with respect to each other. Surrounding the pole-pieces 5 and 7 are the coils $B^2$ and $B^4$ of the other induced circuit 43, the coils being connected in series and being wound in opposite directions with respect to each other. The free ends of the circuit 34 containing the coils $B^1$ and $B^3$ are connected to the brushes 21—22 which contact with the commutator, and the free ends of circuit 43 containing the coils $B^2$ and $B^4$ are connected to the brushes 23—24 which contact with the commutator. In this particular construction I have shown two consuming circuits, but it is to be understood that the number of consuming circuits which may be employed in other constructions is not limited to this number.

With a current flowing in the magnetizing windings, a magnetic flux is set up in the various pole-pieces, the flux in each pole-piece depending upon the resistance of the magnetic circuit traversing said pole-piece. In the position of the parts shown in Fig. 2, the magnetic flux through pole-piece 4 is a maximum and the flux through pole-piece 6 is a minimum, and the flux through each of the pole-pieces 5 and 7 is substantially one-half of the maximum. As the flux varying element is rotated, the resistances of the magnetic circuits through the pole-pieces vary from maximum to minimum, producing a complementary variation of the flux through said pole-pieces and consequently inducing a current in the induced windings, when the apparatus is operated as a generator. A movement of the flux varying element a distance of one-half tooth in a counter-clockwise direction, causes the flux in pole-piece 4 to be reduced one-half, the flux in pole-pieces 5 to reach a maximum, the flux in pole-piece 6 to increase to one-half of the maximum, and the flux in pole-piece 7 to decrease to a minimum. For the movement of the flux varying element a distance equal to the pitch of the teeth, the flux in each pole-piece varies through a complete cycle, in the case of pole-piece 4 from maximum to minimum (substantially zero) and back to maximum. A continuous rotation of the flux varying element will, therefore, cause a continual variation of fluxes through the induced windings, generating an alternating current therein, which is conducted to the commutator.

At the instant when the flux values in two opposite pole pieces are respectively at maximum and minimum, the flux values in the other two pole pieces are approximately intermediate their maximum and minimum values, the maximum values in the two pairs of opposite pole pieces being displaced 90°, so far as their effective value in the generation of an E. M. F. in the respective windings is concerned. Each complete revolution of the flux varying element will generate as many positive and negative impulses as there are projections upon the flux varying element, and in the construction shown in Fig. 2 there will be twenty-one positive and twenty-one negative impulses per revolution. The two pairs of brushes occupy positions on the commutator having a difference of ninety electrical time degrees, corresponding to the phase difference of the current generated in the two circuits.

Arranged adjacent the stationary element 2 and in close relation to the surface formed by pole-pieces and bridges 36, which surface is circular, is a rotating element 31, preferably formed of laminations and provided with a plurality of teeth, facing and lying close to the surface of the bridges 36 and pole-pieces 35. The core or rotating element 31 is arranged concentrically with the core 2, and flux varying element 9, and is mounted upon the rotatable shaft 28, which is supported in bearings 29—30. The commutator 25 and the collecting rings 26—27 are arranged on the shaft 28 and are rotated thereby. The function of the core 31 is to rotate the shaft 28 at a different angular velocity than the flux varying element. The rotation of the core 31 is accomplished by making the bridges 36, connecting the pole-pieces, of such size that they do not carry all of the magnetic flux, thereby causing some of the flux to pass through the core 31, the teeth of which are spaced apart from the surface of the pole-pieces and bridges by a small air gap. The variation of the flux passing through the core 31 causes the teeth thereof to aline themselves successively with the successive stationary pole-pieces.

In the construction shown in Fig. 2 the core 31 is provided with three teeth 44—45—46. As the flux varying element 9 in said figure moves a distance in a counter-clockwise direction, equal to one-half a tooth thereon, the maximum flux passes through pole-piece 5, and since the bridges on opposite sides thereof are insufficient to carry this maximum flux, it must pass in part through the core 31, causing the tooth 46 to move into alinement with the pole-piece 5, in a clockwise direction, or in other words, the movement of the flux varying element through one tooth pitch causes the core 31 to rotate one tooth pitch, and since there are three teeth on the core and twenty-one on the flux varying element, every complete revolution of the flux varying element causes seven complete revolutions of the core, or seven complete revolutions of the commutator. Since there are forty-two impulses induced in the induced windings for every revolution of the flux varying element, and the commutator revolves seven times during such revolution, it is evident that there must be six bars 47 on the commutator. Three of these bars are negative segments connected to the collector ring 26 and three are positive segments connected to the collector ring 27. Brushes 48 bearing on the collector rings are connected to the power leads 32. The segments 47 of the commutator are separated from each other by any suitable insulating material, the width of which is somewhat greater than that of the brushes 21—22—23—24, so that each brush can only contact with one segment at a time. Since the movement of the inner core, carrying the commutator, depends upon the movement of the flux varying element, it is evident that although the inner core possesses a much greater angular velocity than the flux varying element, the core will always have a definite position with relation to the flux varying element, and thus insure proper collection of the generated current at the commutator. In order to reduce sparking at the commutator to a minimum, thereby allowing the employment of high tension currents, I prefer to surround the commutator and brushes with a casing 33 which is filled with a suitable insulating liquid such as oil.

In Figs. 3 and 4, I have shown a modified form of the machine, in which the two rotating elements 9 and 31 are arranged within the stationary element, instead of on opposite sides thereof, as shown in Figs. 1 and 2. The stationary element 2 is formed as a cylinder having a plurality of projections or pole-pieces 35 on its inner surface, which pole-pieces are provided on their inner faces with teeth 37, the inner faces of all of the teeth lying in a circle. Arranged concentrically within the circle of the teeth is the rotatable flux varying element 9, provided on its outer face with a plurality of teeth 38 of the same size and spacing as the teeth on the pole-pieces. The flux varying element is formed of laminations and is supported in the spider or frame 51, secured to the shaft 10, which is supported in bearings 52—53 formed as part of the outer casing 54 which supports the stationary element 2. The flux varying element is substantially cylindrical in shape and the body portion thereof is of insufficient area to carry the maximum flux, so that some of the flux must pass through the inner core 31, thereby causing its revolution as hereinbefore described. The inner core 31 is mounted upon the shaft 28, which is supported within the main shaft 10 and is free to turn therein. The shaft 28 projects from one end of the main shaft and carries the commutator and collecting rings 25—26—27 as before described. In this construction I have employed eight pole-pieces 35 so that an equal torque is exerted upon the flux value and upon the inner core at points diametrically opposite each other. The various magnetizing and consuming or induced windings A and B are arranged on the successive pole-pieces as has been heretofore set forth. In this construction I employ a flux varying element having forty-two teeth 38, and an inner core having six teeth 41. For every revolution of the flux varying element therefor, the inner core 31, or the commutator completes seven revolutions, and since there are forty-two positive and forty-two negative impulses generated at every complete revolution of the flux varying element, the commutator must be provided with six positive and six negative segments 47. It is evident that the commutators on machines of my invention are very much smaller and inexpensive than the commutators on the present standard machines of the same power capacity, which rotate at the same speed as the main shaft. When it is desirable to operate the machine at high tension the oil in chamber 33 may be maintained under pressure by any suitable means to reduce sparking at the commutator brushes. This may be accomplished by connecting the chamber with a supply of oil under pressure or by providing an elevated tank or receptacle 55 containing oil which is in communication with the chamber through a conductor 56. When very high voltages are to be used, such as may be produced by inserting transformers 57—58 Fig. 6 between the induced windings 61—62 and the commutators, it is advisable to employ two commutators mounted on the same shaft and spaced apart from each other. One of these commutators is provided only with positive segments 63 which are connected to the collecting ring 64, and the other is provided only with negative segments 65 which are connected to the collecting ring 66. Each terminal of the secondary of the transformer is connected to two brushes, one engaging one commutator and the other, the other commutator. By thus placing the positive and negative segments on different commutators, they can be much farther removed from each other than if they were placed on the same commutator. The commutator brushes are arranged so that the line circuit is always closed through one transformer. When one of the two brushes connected to each transformer terminal is coincident with a segment on one commutator, the other brush is midway between the segments on the other commutator. This causes all of the positive impulses to be transmitted to one commutator and all of the negative impulses to be transmitted to the other commutator.

In Figs. 5, 8 and 9 I have shown another form of the apparatus which has the same number of pole-pieces, windings, teeth and commutator segments as that shown in Figs. 3 and 4. In this construction, however, the flux varying element 9 and the commutator driving core 31 are not arranged in the same plane but are spaced apart from each other in a direction parallel to the axis of the shafts. The stationary element 2 provided on its inner face with the pole-pieces, is made of insufficient cross section in its body portion to carry the maximum magnetic flux. Attached to or forming part of the stationary element 2, are a plurality of bars or magnetic conductors 67 which extend transversely of the body and project therefrom, terminating at their ends in a circle, preferably of less diameter than the stationary element. These bars are equal in number to the pole-pieces and are arranged substantially mid-way between the side faces or the projected side faces of each pole-piece. Arranged within the circle of the free ends of these bars 67 is the core 31 which drives the commutator or commutators. The excess of the maximum flux which cannot pass from the pole-piece through the body of the stationary element, passes through the bar arranged at said pole-piece, through the commutator driving core and back through the adjacent bars, thus completing the magnetic circuit. As the flux varying element revolves, the flux is shifted and the core 31 is revolved as has been heretofore described.

Since the machine of my invention is adapted to be used with direct currents of very high voltage, and since the tendency of sparking at the commutator increases with the voltage, which sparking has the effect of roughening the surface of the commutator, which would in turn produce greater sparking, I have found it advantageous to employ a commutator which eliminates the use of the commutator brushes. This commutator is illustrated in Figs. 10 and 11. The commutator 71 instead of being formed of segments set with their surfaces flush with each other to form a smooth surface, is formed with a plurality of teeth preferably shaped as gear teeth. The teeth are suitably insulated from each other, and between the teeth 72—73, which form segments of the commutator, are teeth 74 insulated from the others, which operate as teeth only and not as conductors. The teeth 72 are connected to one collector ring 75 and the teeth 73 are connected to the other collector ring 76, of the power line. Meshing with the teeth 72—73—74 at the proper positions around the circle to produce proper commutation are a plurality of gears 77—78—79—80 which are driven by the commutator. The gears 77—78—79—80 are metallic and are provided with collector rings 81—82—83—84 to which are connected the terminals of the secondaries of the transformers 85—86 which are arranged in the two induced circuits. As the commutator revolves, the teeth thereon mesh, of course, with the teeth on the gears 77—78—79—80, the gears and teeth being of such size and pitch that only one of the conducting teeth 72—73 are in contact with any gear 77—78—79—80 at one time. The circuits are opened and closed at the same time as they are when commutator brushes are employed, but the sparking due to worn sliding contacts is entirely obviated. This device is adapted to be used in high tension work, in which case the field of the machine may be separately excited, the voltage of the line current being too high. In the ordinary sliding contact commutators, any irregularities in the surface of the commutator segments or contacting ends of the brushes cause sparking which soon becomes excessive and destroys the commutator. In the present construction, owing to the lack of sliding contacts, the parts do not become worn, sparking is not produced, and hence the commutator has a much longer life than the standard commutators of the present practice.

It is evident that many other forms and modifications of the dynamo electric machine illustrated and described herein will readily suggest themselves to persons familiar with the electrical art, such as changing the relative positions of the various parts and their general form, and so on, but I desire it to be understood that this invention is to be construed broadly and is not to be limited to the specific forms shown herein.

It is not essential in machines of the character described that a magnetizing coil surround each pole-piece since it is possible to construct the machine with coils arranged only on one-half or some other fraction of the pole-pieces, without interfering with its operation. The magnetizing coils also need not necessarily be connected in series, but are so described and illustrated merely to show one form of the invention. From the above it follows that the coils on the succeeding pole-pieces need not be wound in opposite directions, but may be arranged in other relations. The same applies to the induced coils, namely, that it is not necessary that each pole-piece be surrounded by an induced coil, the coils are not necessarily connected in series, and the successive coils are not necessarily wound in opposite directions.

The apparatus is capable of many variations, all of which it would be improper to attempt to show and consider in this application, which under such conditions would become a very large and burdensome document.

I claim:

1. In a dynamo electric machine of the commutating type, a stationary magnetized structure, induced windings on said structure, a rotatable element adapted to produce a varying flux through portions of said stationary structure and induced windings, a second rotatable element traversed by said varying flux and rotated thereby at a higher angular velocity than and in electrical synchronism with said first rotatable element and a commutator attached to said second rotatable element.

2. In a dynamo electric machine of the commutating type, a plurality of magnetized toothed pole pieces, induced windings on said pole pieces, a rotatable element adapted to produce a varying flux in said pole pieces, a second rotatable element traversed by said varying flux and rotated thereby at a higher angular velocity than and in electrical synchronism with said first rotatable element and a commutator attached to said second rotatable element.

3. In a dynamo electric machine of the commutating type, a plurality of stationary magnetic poles, rotatable means for varying the magnetic flux through said poles, a commutator and means operative by said varying flux to rotate the commutator at a different angular velocity than said rotatable flux varying means.

4. In a dynamo electric machine of the commutating type, the combination of a plurality of stationary magnetic pole-pieces, windings on said pole-pieces, a rotatable element operating to vary the magnetic flux through said pole-pieces, a commutator and means operative by said varying flux to rotate the commutator.

5. In a dynamo electric machine of the commutating type, a stationary structure provided with a plurality of magnetic pole-pieces, windings on said pole-pieces, a rotatable element arranged adjacent said pole-pieces adapted to vary the magnetic flux therein, a rotatable member adapted to be rotated by said varying flux at a different angular velocity than said element, and a commutator attached to said rotatable member.

6. In a dynamo electric machine of the commutating type, a stationary structure provided with a plurality of magnetic pole-pieces, means for producing a varying flux in said pole-pieces, a commutator and means operative by said varying flux to rotate the commutator.

7. In a dynamo electric machine of the commutating type, a stationary structure provided with a plurality of magnetic pole-pieces, means for producing a varying unidirectional flux in said pole-pieces, a commutator and means operative by said varying flux to rotate the commutator.

8. In a dynamo electric machine of the commutating type, a stationary structure provided with a plurality of magnetic pole-pieces, the successive pole-pieces being of opposite polarity, means for varying the flux in said pole-pieces, a commutator and means operative by said varying flux to rotate the commutator.

9. In a dynamo electric machine of the commutating type, a plurality of stationary magnetic pole-pieces, windings surrounding said pole-pieces, a plurality of teeth on each of said pole-pieces, a rotatable element provided with a plurality of teeth arranged in close relation to the teeth on said pole-pieces and adapted to vary the flux through said pole-pieces, a second rotatable element adapted to be operated by said varying flux, and a commutator attached to said second rotatable element.

10. In a dynamo electric machine of the commutating type, a plurality of stationary magnetic pole-pieces, windings surrounding said pole-pieces, a plurality of teeth on each of said pole-pieces, the faces of all of said teeth lying substantially in a circle, a rotatable flux varying element arranged concentrically with said teeth and provided with a plurality of similar teeth spaced apart circumferentially thereon, a second rotatable element provided with a different number of teeth than said flux varying element arranged adjacent thereto, and a commutator attached to said second rotatable element.

11. In a dynamo electric machine of the commutating type, a plurality of fixed pole-pieces, magnetizing and induced windings on said pole-pieces, a plurality of teeth on each pole-piece, a rotatable flux varying element provided with a plurality of similar teeth adapted to vary the flux through said magnetizing and induced windings, a rotatable core adapted to be rotated by said varying flux, and a commutator attached to said core.

12. In a dynamo electric machine of the commutating type, a plurality of stationary pole-pieces, magnetizing coils surrounding the pole-pieces, said coils being connected in series and being wound in opposite directions, induced windings surrounding said pole-piece, a rotatable element adapted to vary the flux in said pole-pieces, a rotatable element adapted to be rotated by said varying flux, and a commutator attached to said rotatable element.

13. In a dynamo electric machine of the commutating type, a plurality of stationary pole-pieces, magnetizing windings surrounding said pole-pieces, induced windings surrounding said pole-pieces, the alternate induced windings being connected in groups, the successive windings in each group being wound in opposite directions, means for varying the flux through said pole-pieces, a commutator with which the free ends of the induced circuits are in contact, and means operated by said varying flux for rotating said commutator.

14. In a dynamo electric machine of the commutating type, a plurality of pole-pieces, a magnetizing coil surrounding each pole-piece, said coils being connected in series and being wound in opposite directions on the successive pole-pieces, an induced coil surrounding each pole-piece, the alternate induced coils being connected in series in groups, the successive coils in each group being wound in opposite directions, means for varying the flux through said pole-pieces, a commutator with which the free ends of the induced circuits are in contact, and means operated by the varying flux for rotating said commutator.

15. In a dynamo electric machine of the commutating type, a plurality of pole-pieces, means for establishing a magnetic flux in said pole-pieces, an induced coil surrounding each pole-piece, the induced coils being connected in a plurality of separate circuits, means for varying the flux through said pole-pieces, a commutator with which the free ends of said induced circuits contact, and means operative by said varying flux for rotating the commutator.

16. In a dynamo electric machine of the commutating type, a plurality of pole-pieces, a magnetizing coil surrounding each pole-piece, said coils being connected in series and being wound in opposite directions on the successive pole-pieces, an induced coil surrounding each pole-piece, the induced coils being connected in series in a plurality of circuits, the circuits being arranged symmetrically with respect to each other, and the successive coils in each circuit being wound in opposite directions, means for varying the flux through said pole-pieces, a commutator with which the free ends of said induced circuits contact, and means operated by said varying flux for rotating said commutator.

17. In a dynamo electric machine of the commutating type, a plurality of pole-pieces, magnetizing coils surrounding the pole-pieces, said coils being connected in series, and being wound in opposite directions on the successive pole-pieces, an induced coil surrounding each pole-piece, the induced coils being connected in series in a plurality of circuits, the circuits being arranged symmetrically, and the successive coils in each circuit being wound in opposite directions, rotatable means for varying the flux through said pole-pieces, a commutator with which the free ends of each of said circuits contacts, and means for rotating said commutator at a different angular velocity from said rotatable flux varying means.

18. In a dynamo electric machine of the commutating type, a plurality of stationary pole-pieces, means for producing a magnetic flux in said pole-pieces, induced windings surrounding said pole-pieces, a rotatable element adapted to vary the flux in said pole-pieces, a commutator and means operative by said varying flux to rotate the commutator at a greater angular velocity than said element.

19. In a dynamo electric machine of the commutating type, a plurality of stationary pole-pieces, a plurality of teeth on each pole-piece, a magnetizing coil surrounding each pole-piece, said coils being connected in series and being wound in opposite directions on the succeeding pole-pieces, an induced coil surrounding each pole-piece, the induced coils being connected in series in a plurality of circuits, the successive coils in each circuit being wound in opposite directions, a rotatable element arranged adjacent the teeth on said pole-pieces, teeth on said rotatable element adapted to vary the flux through said pole-pieces, a toothed core arranged adjacent said pole-pieces, and adapted to be rotated by the variation in flux therein, and a commutator connected to said toothed core.

20. In a dynamo electric machine of the commutating type, a plurality of pole-pieces, each provided with a plurality of teeth, magnetizing and induced windings surrounding said pole-pieces, a rotating element having a predetermined number of teeth adapted to vary the flux through said pole-pieces, a rotatable core having a predetermined number of teeth adapted to be rotated by said varying flux, and a commutator attached to said rotatable core, said commutator having a number of segments equal to twice the number of teeth on the flux varying element divided by the quotient of the number of teeth on the flux varying element divided by the number of teeth on the rotatable core.

21. In a dynamo electric machine of the commutating type, a plurality of pole-pieces each provided with a plurality of teeth, magnetizing and induced windings surrounding said pole-pieces, a rotatable element having a plurality of teeth adapted to vary the flux through said pole-pieces, a rotatable core having a lesser number of teeth than said element adapted to be rotated by said varying flux and a commutator attached to said core, said commutator having twice as many segments as there are teeth on the core.

22. In a dynamo electric machine of the commutating type, a plurality of pole-pieces, laminated connectors between the pole-pieces, magnetizing and induced windings surrounding said pole-pieces, a rotatable element adapted to vary the flux through said pole-pieces, said laminated connectors carrying a portion of said varying flux, a rotatable element traversed by another portion of said varying flux and adapted to be rotated by said last named portion of said flux, and a commutator attached to said last named rotatable element.

23. In a dynamo electric machine of the commutating type, a plurality of magnetic pole-pieces, a rotatable element adapted to vary the flux in each pole-piece from maximum to minimum and vice versa, and a rotatable core, the area of the magnetic circuit passing through each pole-piece being such that with a maximum flux in the pole pieces a material portion thereof is directed through the rotatable core and rotates said core.

24. In a dynamo electric machine of the commutating type, a commutator having segments adapted to be engaged by the terminals of the stationary induced windings in said machine, a pair of collector rings associated with said commutator, the segments being connected alternately to said rings, and brushes contacting with said rings.

25. In a dynamo electric machine of the commutating type, a stationary structure, a plurality of pole-pieces on said structure, the faces of the pole-pieces lying in a circle, a plurality of teeth on each pole-piece, magnetizing and induced windings arranged on the pole-pieces, a rotatable element adapted to vary the flux in each pole-piece, said rotatable element being arranged concentrically with the teeth on said pole-pieces, a plurality of teeth on said rotatable element of the same pitch as the teeth on the pole-pieces facing the teeth on the pole-pieces, a core having a different number of teeth than said rotatable element arranged within and concentric therewith, and a commutator attached to said core.

26. In a dynamo electric machine of the commutating type, a stationary structure, a plurality of pole-pieces arranged radially of said structure, a plurality of teeth on the outer faces of said pole-pieces, magnetizing and induced windings surrounding said pole-pieces, a rotating element arranged concentric with said teeth, a plurality of teeth on said element of the same pitch as the teeth on the pole-pieces arranged in close relation thereto, a rotatable core having a less number of teeth than said rotatable element, arranged within said pole-pieces and bridges, a shaft upon which said core is mounted, a commutator mounted on said shaft, brushes connected to the induced windings contacting with said commutator, and collector rings connected to the alternate segments of said commutator mounted on said shaft, said pole-pieces being connected at their inner ends by bridges of such area that with a maximum flux in the pole-pieces a material portion thereof is directed through the rotatable core.

27. In a dynamo electric machine of the commutating type, a plurality of pole-pieces, magnetizing and induced windings on said pole-pieces, means for varying the flux in said pole-pieces, a rotatable core having a less number of teeth than there are pole-pieces arranged in magnetic association therewith, and adapted to be rotated by said varying flux, and a commutator attached to said core.

28. In a dynamo electric machine of the commutating type, a plurality of groups of magnetic poles, the poles of each group being of like polarity, a single induced winding surrounding each group, the induced windings being connected in a plurality of circuits, a rotatable element for varying the magnetic flux in each group of poles, and a commutator adapted to be revolved by said varying flux at a different angular velocity than said rotatable element.

29. In a dynamo electric machine of the commutating type, a plurality of groups of poles, the poles in each group being of like sign, a single magnetizing winding surrounding each group, a single induced winding surrounding each group, circuits connecting said induced windings, a rotatable element adapted to simultaneously and similarly vary the flux through the poles of each group, and a commutator adapted to be revolved by said varying flux.

30. In a dynamo electric machine of the commutating type, a plurality of groups of poles, the poles of each group being of like polarity, a single magnetizing winding surrounding each group, the various windings being arranged to cause the poles of the successive groups to be of opposite polarity, a single induced winding surrounding each group, the induced windings being connected in series in a plurality of circuits, a commutator with which the ends of the induced circuits are in contact, a rotatable element adapted to vary the flux in each group of poles from maximum to minimum, and a rotatable core, to which the commutator is attached, said core being adapted to be rotated by the varying flux at a greater angular velocity than the rotatable element.

31. In a dynamo electric machine of the commutating type, a plurality of pole-pieces, a series of projections on each pole-piece, each two of said pole-pieces forming a group, a magnetizing winding surrounding said pole-pieces, an induced winding surrounding each of said groups forming an induced circuit, a rotatable element provided with a plurality of equidistant projections facing the projections on the pole-pieces, said rotatable element operating to vary and conduct said magnetic flux through said pole-pieces, the projections on the pole-pieces belonging to one group occupying a different position with regard to the projections on the rotatable element from that occupied by the teeth on the pole-pieces in another group, a rotatable commutator core provided with a smaller number of projections than said rotatable element adapted to be traversed and rotated by a portion of the varying flux at an angular velocity determined by the relative number of projections on said rotatable element and on said commutator core, a commutator driven by said commutator core, the commutator being provided with as many positive and as many negative segments as there are projections on said commutator core, a collector ring connected to said positive segments, a collector ring connected to said negative segments, a plurality of pairs of brushes contacting with said commutator, the free leads of each of said induced circuits connected to each of said pairs of brushes, each of said pairs of brushes having a position on the commutator, the relation of which to the commutator segments is similar to the relation of the projections on the pole-pieces belonging to the corresponding group, to said projections on the rotatable element.

32. In a dynamo electric machine of the commutating type, a plurality of stationary pole-pieces, a series of projections on each pole-piece, each multiple of two of said pole-pieces forming a group, means for producing a magnetic flux in said pole-pieces, an induced winding forming an induced circuit surrounding each of said groups of pole-pieces, a rotatable element provided with a plurality of equidistant projections facing said projections on the pole-pieces, said rotatable element operating to vary and conduct the flux through said pole-pieces, the projections on the faces of said pole-pieces belonging to one group occupying a different position with relation to the projections on the rotatable element, than the projections on the pole-pieces of another group, a rotatable commutator core provided with a smaller number of equidistant projections than said rotatable element adapted to be traversed and rotated by a portion of the rotatable element at a greater angular velocity than said rotatable element a commutator carried by said commutator core provided with twice the number of segments as there are projections on the commutator core, collector rings connected to said commutator segments, and a plurality of pairs of brushes contacting with said commutator, the free ends of each of said induced circuits being connected to each of said pairs of brushes.

In testimony whereof, I have hereunto set my hand at San Francisco, California, this 11th day of April, 1913.

ALFONS H. NEULAND.

In presence of—
H. G. Prost,
M. Le Conte.